United States Patent [19]
Blubaugh et al.

[11] 3,755,905
[45] Sept. 4, 1973

[54] METHOD AND APPARATUS FOR OPTICAL ALIGNMENT OF INDUSTRIAL EQUIPMENT

[75] Inventors: Robert L. Blubaugh; Robert A. Ruckle; Hubert J. Watts, all of Ponca City, Okla.

[73] Assignee: Continental Oil Company, Ponca City, Okla.

[22] Filed: June 25, 1969

[21] Appl. No.: 836,503

Related U.S. Application Data

[63] Continuation-in-part of Ser. No. 702,478, Feb. 1, 1968, abandoned.

[52] U.S. Cl. .................. 33/286, 33/293, 33/125 T
[51] Int. Cl. ............................................. G01c 21/00
[58] Field of Search ...................... 33/125 R, 125 T, 33/74, 46 AT, 95, 143 G; 248/122, 125, 124

[56] References Cited
UNITED STATES PATENTS

| | | | |
|---|---|---|---|
| 1,583,585 | 5/1926 | Emery | 33/143 G |
| 1,324,963 | 12/1919 | Hayes | 33/95 |
| 1,476,077 | 12/1923 | Hort | 33/46 AT |
| 2,366,950 | 1/1945 | Wright | 248/122 |
| 2,801,818 | 8/1957 | Wojdyla | 248/125 |
| 2,873,529 | 2/1959 | Hogan et al. | 33/1 H |
| 2,914,855 | 12/1959 | Daum | 33/74 D |

FOREIGN PATENTS OR APPLICATIONS

| | | | |
|---|---|---|---|
| 1,050,061 | 12/1966 | Great Britain | 33/125 T |

*Primary Examiner*—William D. Martin, Jr.
*Attorney*—Joseph C. Kotarski, Henry H. Huth, Jerry B. Peterson, William J. Miller, David H. Hill and Craig, Antonelli, Stewart and Hill

[57] ABSTRACT

A method and apparatus for aligning kinematic trains of industrial apparatus by optical metrology, the method including the steps of establishing a reference line of sight adjacent the devices in the kinematic train and extending generally parallel to the train, then obtaining precise measurements to reference points on the several devices by optical measurements. The measurements are made when the apparatus is in a cold, inoperative state. Then, after the apparatus has become heated and is in operation, a reference line of sight is again established adjacent the devices in the kinematic train, and measurements are again made from the line of sight to the same reference points on the devices that were used in obtaining the cold measurements. Comparison of the sets of hot and cold measurements is then made to determine the shift or change in position of the devices relative to each other which has occurred in the course of the operation of the apparatus.

In carrying out the described method of the invention, apparatus is utilized which permits very accurate measurements to be taken between the reference line of sight and the reference points on the apparatus in the kinematic train. This apparatus includes an optical scale mounted in a scale holder which securely retains the scale in a measuring position, and which is constructed of materials which are affected to a minimum extent by changes in the thermal environment. The scale holder is constructed to allow maximum flexibility in usage, and so that it may be firmly contacted with tooling balls mounted on the apparatus in the kinematic train and functioning as reference points. The apparatus also includes structure for supporting the scale holder in selected positions for purposes of measuring from the reference points to the reference line of sight. Such scale holder supporting apparatus includes a vertical standard having a clamping device pivotally mounted thereon for clamping the scale holder, and a horizontal stabilizer rod having a clamping device thereon for clamping the scale holder.

12 Claims, 24 Drawing Figures

Patented Sept. 4, 1973

INVENTORS.
ROBERT L. BLUBAUGH,
ROBERT A. RUCKLE &
HUBERT U. WATTS

BY William J. Miller

ATTORNEY

INVENTOR.
ROBERT L. BLUBAUGH,
ROBERT A. RUCKLE &
HUBERT U. WATTS

BY

ATTORNEY

METHOD AND APPARATUS FOR OPTICAL ALIGNMENT OF INDUSTRIAL EQUIPMENT

RELATED APPLICATIONS

This application is a continuation-in-part of U.S. Pat. application Ser. No. 702,478 entitled "Adapter Device for Optical Alignment Scales" filed Feb. 1, 1968, now abandoned, and assigned to the assignee of the present application.

BACKGROUND OF THE INVENTION

1. Field of the Invention

This invention relates to methods and apparatus for optically aligning machinery, and more particularly, to a method and measuring devices used for identifying with precision, the distances which various points on machines connected in a kinematic train shift during the operation of such machines.

2. Brief Description of the Prior Art

In our co-pending application Ser. No. 702,478, we have described an adapter device for holding optical scales so that such scales can be more accurately employed for measuring from predetermined points on machinery to an optical line of sight. The adapter device functions to extend the effective length of the scale of the optical scale, and also to modify the geometry of the scale in such a way that it can be used in a greater variety of positions, and with less difficulty, in permitting accurate optical measurements to be made from a reference line of sight which is optically established, to a series of reference points on machinery which is interconnected in a kinematic train. We have now further improved upon the adapter device or scale holder apparatus described in said co-pending application, and have also improved the methods by which such apparatus is employed in the optical alignment of industrial machinery which is interconnected in a kinematic train.

BRIEF DESCRIPTION OF THE PRESENT INVENTION

In the method of alignment of a train of drivingly interconnected machines as practiced in accordance with the present invention, reference points are first established on the machines in the train to permit measurements to be made between these points and lines of sight established adjacent the machinery. The measurements are to be made in a horizontal direction to evaluate horizontal alignment of the machines in the train, and usually it will also be desirable to take measurements in a vertical plane to evaluate the vertical alignment of the machines. The establishment of the reference points is preferably effected by securing tooling balls at selected locations on the machinery.

An optical sighting instrument is then positioned adjacent the machinery in the train on a stable supporting platform or base. This optical instrument is then used to optically establish a reference line of sight extending along side of (or over) the train of machinery. Then, while the machinery is in a cold or non-operating state, the temperature of the machinery and the ambient temperature are measured. The distances from the reference line of sight to the several reference points are then measured. These measurements are made along lines extending normal to the line of sight between this line and the several reference points. The initial set of such measurements is made while the machinery is in the cold, inoperative status. At this time the extent to which the several machinery units are aligned (or misaligned) is known, as a result of alignment measurements made using known millwright procedures. The initial "cold" measurements made in accordance with the present invention are thus made from units of machinery which occupy a known alignment relationship to each other at this time.

After the set of "cold" readings has been obtained in the manner described, the machinery is operated and is thus subjected to the vibrational and thermal stresses which are developed at this time. Due to these forces, the units of machinery in the kinematic train will frequently be caused to drift or move out of alignment to a degree such that undesirable distorting forces are developed in the interconnecting shafting and transmitted to bearings, rotors and the like so that these elements are ultimately damaged and fail. Previously, the most widely used method of evaluating the extent to which such operating misalignment occurred was simply to attempt to mathematically calculate the effect of thermal expansion of the machinery units in the kinematic train, basing such calculations upon the known thermal expansion properties of the materials of construction of the machinery, and the estimated operating and environmental temperatures. This method did not take into account vibrational stresses and other acting forces, and was seldom more than a rough approximation of what might be expected in the way of misaligning shifts in the positions of the units in the train.

Using the method of the present invention, the misalignment occurring during operation is actually measured. Thus, while the machinery is hot and in operation, a second set of measurements are made from the same reference points on the machinery to an optically established, reference line of sight. There are also obtained at this time, measurements of the temperature of the machinery and of the ambient environment. The set of hot measurements is then corrected as may be required to compensate for thermal expansion of the measuring apparatus, and for thermal expansion of the machinery which causes the reference points to be displaced from the central longitudinal axes of the machinery units on which the reference points are located. These corrected hot measurements are then compared with the set of cold measurements in a manner to obtain a convergence factor which is used to correct the "hot" line back to the "cold" line position, and then evaluating the extent to which the units in the train have become misaligned as a result of operation.

The accuracy with which the described measurements are made is extremely important, since the development of several hundredths of an inch misalignment between machines interconnected by shafting can result in early failure of bearings and other elements of the apparatus. To the end of more accurately measuring the distances between the line of sight and the reference points, certain apparatus has been conceived and developed specifically for this purpose. This apparatus may be generally described as functioning to support, and facilitate the positioning of, a commercially available optical scale so that it may be more accurately and flexibly utilized. Broadly described, the apparatus comprises an elongated scale holder shaft which has an elongated, scale-receiving slot extending along a portion of its length for receiving the optical scale, means for securing the scale to the shaft, and a contact tip connected to one end of the shaft for contacting a reference point on the machinery. The apparatus may further include structure for supporting the scale holder shaft in selected positions in which the optical scale intersects the reference line of sight while extending along a line normal to the line of sight and containing the reference point. This supporting structure includes a vertical standard having a clamping device pivotally mounted thereon for clamping the scale holder shaft, or an appendage thereof, in desired position. A horizontal stabilizer rod is also provided which can be secured at one end to a point of support, and then extended outwardly in a generally horizontal direction to permit a second clamping device to be used to connect the stabilizer rod to the scale holder shaft, or to an appendage thereof.

An important and broad object of the invention is to provide a method for evaluating the alignment of machinery which is drivingly interconnected in a kinematic train.

A more specific object of the invention is to accurately identify the precise relative locations of the machinery units in a kinematic train while such units are functioning at operating temperatures.

An additional object of the invention is to provide optical metrology apparatus which can be effectively and easily employed to obtain highly accurate measurements from a reference line of sight to reference points spaced horizontally along interconnected machinery.

Additional objects and advantages will become apparent as the following detailed description of the invention is considered in conjunction with the accompanying drawings.

DETAILED DESCRIPTION OF PREFERRED EMBODIMENTS OF THE INVENTION

In order to more meaningfully describe the method of optical alignment proposed by the invention at a later point in the specification, it is believed that it will be helpful to initially describe the apparatus which has been developed for use in such method. Therefore, reference will initially be made to selected figures of the drawings which illustrate this apparatus, and two embodiments of the scale holder device forming a portion of the apparatus will be described prior to describing the use of this apparatus in the practice of the method of the invention.

In referring to the structure shown in the drawings, lead lines having arrowheads are used to designate broad structural combinations. Lead lines not having arrowheads are used in referring to individual structural elements.

Figure 1:
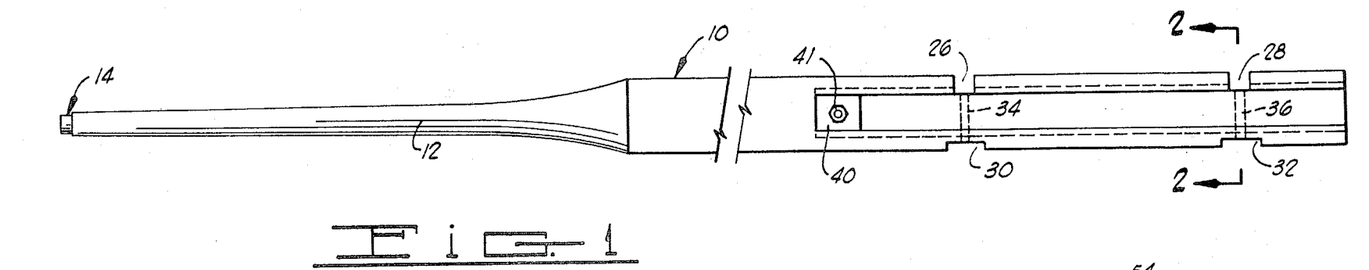
FIG. 1 is a side elevation view of one embodiment of a scale holder device constructed in accordance with the invention.

Referring initially to FIG. 1 of the drawings, the scale holder device of the invention, in one embodiment, includes shaft means 10 which comprises an elongated rod 12 and a metal contactor 14. The elongated rod 12 is constructed of a material having a low coefficient of thermal expansion, with a phenol-formaldehyde resin having asbestos fibers embedded therein constituting a preferred material of construction. A material of this type is sold under the trade name SYNTHANE by the Synthane Corporation of 15 River Road, Oaks, Pennsylvania.

Figures 3, 4, 5:
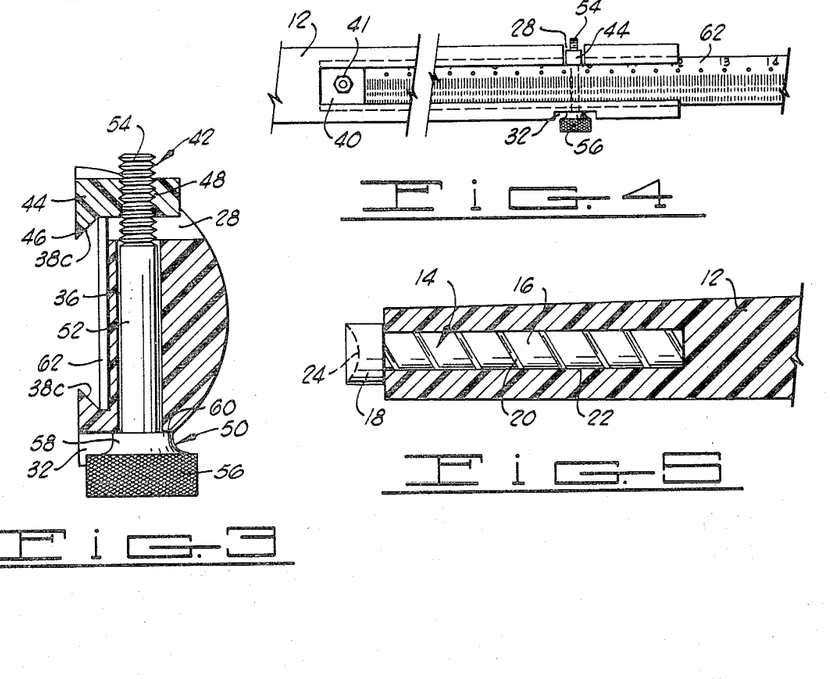
FIG. 3 is a sectional view similar to FIG. 2, but further depicting one of the quick-connect clamps used on the scale holder device, and illustrating an optical alignment scale retained in position by such clamps.
FIG. 4 is a detail elevational view of an end portion of the scale holder device shown in FIG. 1, depicting the manner in which one of the quick-connect clamps is attached thereto, and showing an optical alignment scale clamped in the scale holder.
FIG. 5 is a detail view, partially in elevation and partially in section, showing the end of the scale holder device which carries a metal contactor.

The contactor 14 is best shown in FIG. 5, is preferably made of stainless steel and includes an elongated shank portion 16 and a relatively large head portion 18 secured to one end of the shank portion. The shank portion 16 carries a spiral groove 20 around its periphery to accommodate glue, and to retain the shank portion securely in an elongated bore 22 formed in one end of the rod 12. The head portion 18 of the contactor 14 is provided with a frusto-spherical concavity 24 illustrated in dashed lines in FIG. 5, and employed for a purpose hereinafter described.

Figure 2:
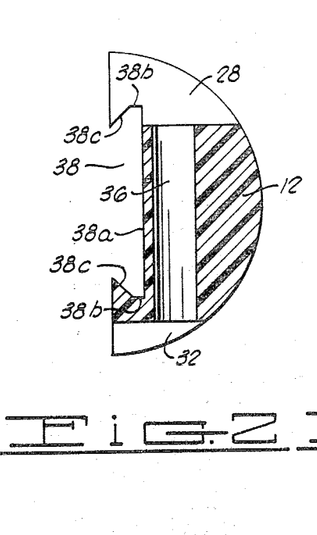
FIG. 2 is a sectional view taken along line 2—2 of FIG. 1.

It will be noted that the end of the rod 12 which carries the metal contactor 14 is of relatively small diameter, and that the rod is then enlarged at a point intermediate its length to a relatively large diameter. At this point, the rod 12 assumes a semicylindrical cross-sectional configuration over the remainder of its length (see the sectional view of FIG. 2). As shown in FIGS. 1 and 2, the rod 12 is transversely relieved or notched at a plurality of locations spaced along its length, with two such reliefs or notches, 26 and 28, being depicted in FIG. 1. It will further be noted that disposed on the opposite sides of the rod 12 from the notches 26 and 28 are another pair of transversely extending notches 30 and 32. The notches 30 and 32 communicate with the notches 26 and 28 through a pair of transversely extending holes 34 and 36, respectively. The relative arrangement of the transversely extending notches and holes can be best understood by referring to FIG. 2 where these are illustrated in enlarged form.

Extending longitudinally along the elongated rod 12 from its end opposite the end carrying the metal contactor 14 is a scale-receiving slot 38. The generally trapezoidal cross-sectional configuration of the slot 38 is best illustrated in FIG. 2. The slot 38 may also be described as undercut, and more specifically, as having a bottom wall 38a, a pair of parallel side walls 38b, and a pair of converging upper walls 38c. At the innermost end of the slot 38, a rectangular metal stop plate 40, which extends between the side walls 38b and abuts the rod 12 at the end of the slot, is glued in the slot, and is further secured in a fixed position by a screw 41 passed through the plate and into the rod. The stop plate 40 is made of a hard metal having a low coefficient of thermal expansion.

Quick-connect clamps are utilized to connect a graduated optical tooling scale in an invariant or fixed position in the scale receiving slot 38. A preferred embodiment of the quick-connect clamp is designated generally by reference numeral 42 and is illustrated in FIGS. 3 and 4. The clamp 42 includes a dog 44 which is provided with a tapered lip 46 and a centrally located, threaded aperture 48. The quick-connect clamp 42 further includes a bolt 50 which has an elongated shank 52 threaded over one end portion 54, and connected to a knurled head 56 by means of a tapered neck 58. The tapered neck 58 has a shoulder or flat 60 immediately adjacent, and surrounding, the shank 52. The diameter of the shank 52 is only slightly smaller than the diameter of the hole 36.

In FIGS. 3 and 4 of the drawings, an optical scale 62 is shown mounted in position in the scale holder device 10. The scale 62 is positioned by initially inserting it in the slot 38 to a point where one of its ends abuts firmly against the stop plate 40. With the optical scale 62 positioned in the slot 38, a pair of dogs 44 constituting parts of two quick-connect clamps 42 of the type hereinbefore described are positioned in the notches 26 and 28. The threaded bolts 50 are then extended through the respective holes 36, and are threadedly engaged with the dogs 44 located in the notches 26 and 28 on the opposite sides of the rod 12. As the knurled head 56 of each quick-connect clamp 42 is rotated, the respective dog 44 is drawn in a transverse direction with respect to the rod 12, and bears against one of the longitudinal edges of the scale 62 so that the scale is clamped tightly in position.

The optical scale 62 is conventionally constructed of a metal having a very low coefficient of thermal expansion, and this factor, coupled with the fixed position of the metal stop plate 40, and the resistance to wear of the metal side thereof which abuts the edge of the optical scale, assures that when this scale is clamped in the rod 12, it will, upon each occasion of use, occupy the same position as it may have previously occupied during a prior use.

As will be hereinafter described, the concavity 24 formed in the outer free end of the metal contactor 14 facilitates the placement of the scale holder device 10 in precise and firm contact with a tooling ball which is placed on machinery to be aligned, and which is used as a reference point from which measurements are made using the optical scale 62 carried by the scale holder device 10. The tapering of the rod 12 to a very small diameter at its end which carries the metal contactor 14 assures that the metal contactor may be directed by the rod through a very close or confined space so as to bear against a selected reference point, even though the latter is relatively inaccessible. Moreover, where tooling balls are used as reference points in accordance with a preferred practice of the method of the invention, the formation of the concavity 24 to mate with such tooling balls permits the rod 12 to be more easily extended in a plurality of directions and permits the rod 12 and the optical scale 62 to be utilized to measure from the tooling ball to reference lines of sight located in various orientations with respect to the machinery as hereinafter described.

Figures 6, 7, 8, 9, 10:
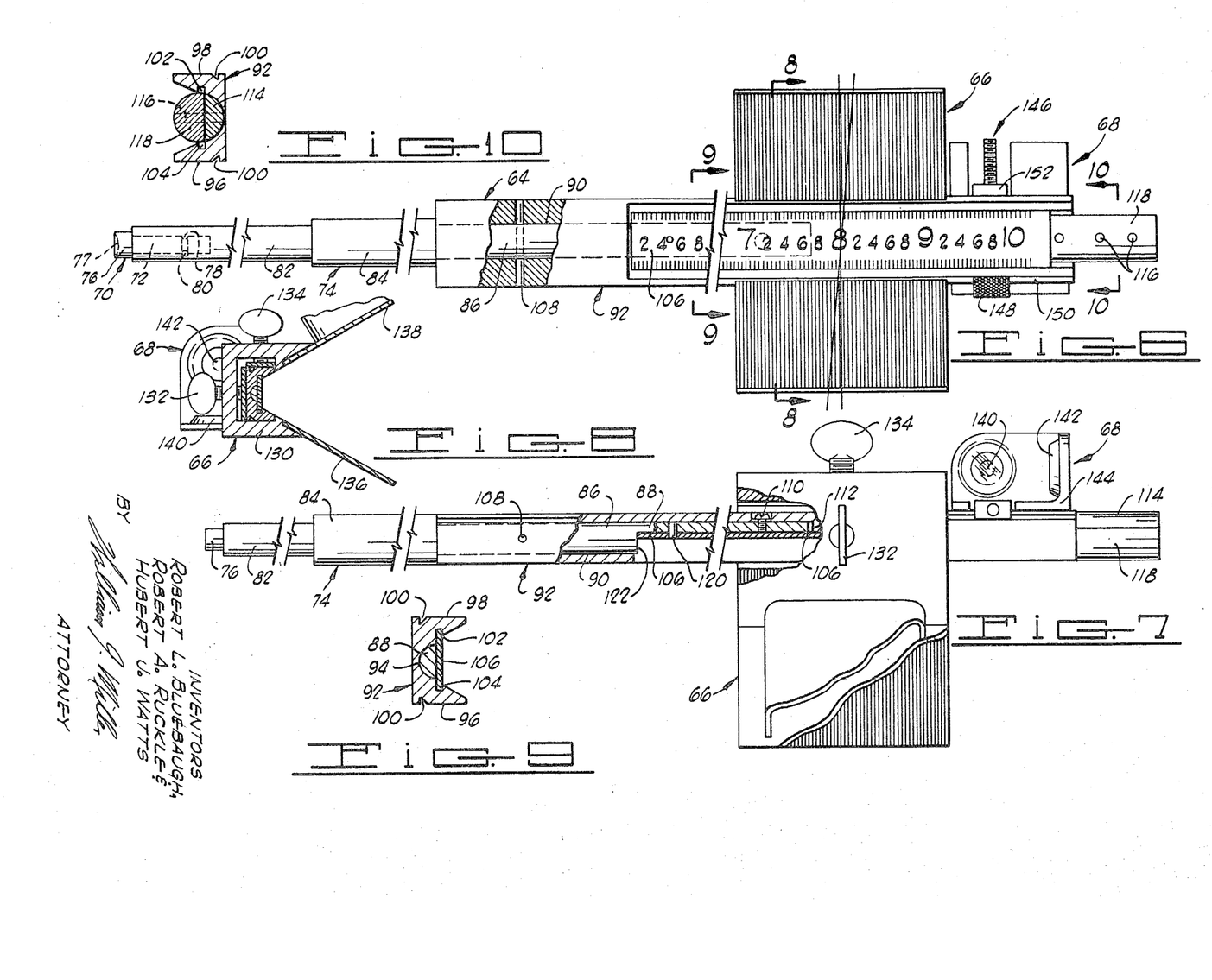
FIG. 6 is a partially sectional, partially elevational view of a preferred embodiment of a scale holder device constructed in accordance with the invention, and depicting a scale mounted in the device, and a viewing box and compound spirit level attached to the scale holder device.
FIG. 7 is a view, partially in section and partially in elevation, of the scale holder device, viewing box and level depicted in FIG. 6 and this assembly appears when rotated through an angle of 90° about the longitudinal axis of the scale holder device from the position of the assembly shown in FIG. 6.
FIG. 8 is a sectional view taken along line 8—8 of FIG. 6.
FIG. 9 is a sectional view taken along line 9—9 of FIG. 6.
FIG. 10 is a sectional view taken along line 10—10 of FIG. 6.

A preferred embodiment of the scale holder device of the invention is depicted in FIGS. 6–10 and is designated generally by reference numeral 64. As shown in FIGS. 6–8, the scale holder device 64 is utilized in the practice of the method of the invention with a viewing box, designated generally by reference numeral 66, and with a compound spirit level, designated generally by reference numeral 68. It should be pointed out that the viewing box 66 and compound spirit level device 68 can also be utilized with the scale holder device 10 for purposes of leveling and normalizing as will be hereinafter described when referring to the mode of use of the scale holder devices in the method of the invention. These structural elements form no portion of the present invention, but are merely adjuncts to the use of the apparatus of the invention.

The scale holder device 64 depicted in FIGS. 6–10 includes a stainless steel contactor 70 which has an elongated shank 72 extending into a mating bore formed in one end of a metallic rod 74 which is made of a metal having a low coefficient of thermal expansion as hereinafter explained. The contactor tip 70 further has a head portion 76 attached to the shank 72, and this head portion is provided with a semi-spherical recess 77 at its free end for mating contact with a tooling ball reference point as hereinafter described. The shank 72 of the contactor 70 is provided with a circumferential groove 78 which permits the contactor to be secured in place in the end of the rod 74 by means of a transverse securing pin 80. The securing pin 80 can be easily removed at such time as it may be desired to renew or replace the contactor 70. It should also be here mentioned that the contactor 70 can be mounted in the rod 74 by other methods, such as by forming a screw thread around shank 72 and screwing this into a threaded bore formed in the end of the rod.

As previously stated, the rod 74 is constructed of a metal having a low coefficient of thermal expansion, and is preferably constructed of Invar, a nickel alloy manufactured by the Carpenter Steel Company of Reading, Pa. The rod 74 includes a relatively small diameter cylindrical end portion 82, a relatively large diameter intermediate cylindrical portion 84, a relatively small diameter cylindrical intermediate portion 86, and a semicylindrical end extension 88. As best illustrated in FIGS. 6 and 7, the relatively small diameter intermediate portion 86 of the rod 74 extends into a cylindrical bore 90 formed in an elongated, scale receiving shaft designated generally by reference numeral 92.

The scale receiving shaft 92 is preferably constructed of aluminum, and in that portion of the shaft which extends beyond the bored portion receiving the relatively small diameter intermediate portion 86 of the rod 74, has the cross-sectional appearance depicted in FIG. 9. Thus, the shaft 92 has a semicylindrical groove 94 formed therein which receives the semicylindrical end portion 88 of the rod 74. The shaft 92 is further provided with a pair of substantially parallel side walls, 96 and 98, which are each provided with inwardly extending grooves 100. Adjacent the semicylindrical slot 94, the shaft 92 is provided with a pair of opposed scale receiving slots or grooves 102 and 104. An optical scale 106 is positioned in the grooves 102 and 104 and over the semicylindrical end portion 88 of the rod 74 in a manner hereinafter described.

For the purpose of retaining the rod 74 in its position of insertion in the shaft 92, a securing pin 108 extends transversely through the shaft, and through a suitable diametric aperture formed in the small diameter intermediate portion 86 of the rod 74 as best illustrated in FIG. 6. There is also provided, a screw 110 which is extended through the portion of the shaft 92 immediately below the semi-cylindrical groove 94, and into a threaded aperture formed in the semicylindrical extension 88 of the rod 74. The head of the screw 110 is located in an oversized recess formed in the shaft 92 so that, as the shaft undergoes thermal expansion, the screw 110 is not stressed. It will be noted in referring to FIG. 7 that the end of the semicylindrical extension 88 of the rod 74 is spaced from a shoulder 112 formed at the end of the semicylindrical groove 94 in the shaft 92.

At its end opposite the end into which the relatively small diameter intermediate portion 86 of the rod 84 is extended, the shaft 92 carries a projecting semicylindrical extension 114 which is preferably formed integrally with the remainder of the shaft. Secured by suitable pins or screws 116 to the flat upper side of the semicylindrical extension 114 is a semicylindrical top member 118 which is complementary in configuration to the semicylindrical extension 114 and thus forms a round cross-sectional element projecting from the end of the shaft 92.

The optical scale 106 is mounted in the scale holder device 64 by removing the top member 118 from the semi-cylindrical extension 114 and passing the edges of the scale into the slots 102 and 104 formed in the rectangularly cross-sectioned portion of the shaft 92. The optical scale 106 is secured against sliding movement in the slots 102 and 104 by extending a pin 120 through a small hole formed in the scale 106 and into a registering hole formed in the semi-cylindrical extension 88 of the rod 74. It will be noted that the inner end of the optical scale 106 abuts the shoulder 122 formed on the rod 74 at the location where the relatively small diameter intermeidate cylindrical portion 86 of the rod is joined to the semicylindrical extension 88 thereof.

The scale holder device 64 is constructed in the manner described to reduce to a minimum, the error introduced in scale readings as a result of changes in the thermal environment. In other words, the Invar material hereinbefore described of which the rod 74 is preferably constructed has a very low thermal expansion, and the aluminum metal of which the shaft 92 is constructed, while undergoing some elongation and contraction with changes in the thermal environment, minimally affects the location of the optical scale 106 during these movements because of the manner in which the scale is pinned to the Invar rod 74, and the manner in which the shaft 92 is attached by the screw 110 to the semicylindrical extension 88 of the rod 74.

Adjustably positioned along the length of the shaft 92 are the viewing box 66 and the dual spirit level device 68. The structure and functions of these devices are described in detail in co-pending U. S. Pat. application Ser. No. 828,911 entitled Method and Apparatus for Opitcal Alignment filed May 27, 1969 and assigned to the assignee of the present application. For sufficiency of detail in hereinafter describing the method of the present invention, however, it may be pointed out that the viewing box 66 includes a C-shaped channel member 130 which can be clamped to the shaft 92 of the scale holder device 64 by means of set screws 132 and 134, and which has secured to the parallel legs thereof, a pair of diverging plates 136 and 138. The plates 136 and 138 carry on the opposed or facing surfaces thereof, a series of fine parallel lines which are preferably spaced from each other by a distance of about 0.025 inch. These lines are used for positioning the scale holder device 64 and the optical scale 106 which it carries along a line which extends normal to a reference line of sight in the practice of the method of the invention as hereinafter described. The same or a similar viewing box is utilized with the scale holder device 10 shown in FIGS. 1–5 for substantially the same purpose.

The compound spirit level device 68 includes a pair of bubble or spirit levels 140 and 142 which are mounted at right angles to each other on a suitable bracket 144. The bracket 144 can be clamped to the shaft 92 of the scale holder device 64 by means of a screw and flange assembly 146 which includes a threaded bolt 148 which extends through a pair of flanges 150 and 152 and functions to draw these flanges toward each other so that the compound spirit level 68 may be clamped to the sides 96 and 98 of the shaft 92. It will be apparent that both the viewing box 66 and the compound spirit level 68 are adjustable in their positioning along the shaft 92.

METHOD OF THE INVENTION AND OPERATION OF THE APPARATUS

The apparatus which has been hereinbefore described is utilized in the method of the invention for checking or evaluating the optical alignment of a plurality of machinery units which are drivingly interconnected in a kinematic train. For example, such a train of machinery may include compressors and turbines which are interconnected through a coupling between input and output shafting. It is important that the individual machinery units in such train be maintained within certain alignment tolerances, since misalignment or angulation of one unit with respect to another in the train imposes destructive stresses upon the coupling, shafting, bearings and the like.

As has been previously indicated, it is presently possible, and is the practice, to obtain alignment measurements when the machinery is in a cold inoperative state by taking so-called dial indicator readings (usually performed by millwrights), and from these readings determining any offset of one unit which might exist with respect to another. The dial indicator readings also permit determination of any angulation of the axes of rotation of the shafts of adjacent units. The same method cannot be used, however, to measure or evaluate any shifting or change of position of the units in the train at a time when these units are heated and operating. The method of the present invention allows identification of the extent of change in the relative locations of the several units which has occurred during operation, so that any misalignment which occurs as a result of operation can be recognized and corrected.

In the practice of the method of the invention, the physical environment of the kinematic train which is to be checked for alignment is first observed to determine where reference points for taking certain measurements can best be established on the several machinery units in the train, and also where a reference line of sight may be optically established so as to extend alongside of, and substantially parallel to, the kinematic train with free and unobstructed access to the reference points. In other words, the reference points and the line of sight must be located in such a way relative to each other that distance measurements can be made between the reference points and the line of sight along lines which extend normal to the line of sight.

It is desirable in the establishment of reference points on the machinery units in the kinematic train to place these reference points as near to the center line of the shafting of the machinery as possible, and also to establish the reference points in locations which are accessible to the measuring apparatus which is utilized in the method, this being constituted by the scale holder devices and optical scales hereinbefore described. We have determined that the best reference points are constituted by small spherical tooling balls set permanently into the housing of the machinery at locations which are substantially in horizontal alignment with the axis of rotation of the shafting, and which are located as near to this axis as physically possible. It is, moreover, desirable to have at least two of the reference points located adjacent opposite ends of each unit of machinery, and separated by the maximum linear distance possible consistent with the other desideratum hereinbefore described, and with the desirability of having at least two reference points located on each of the units.

In considering where the line of sight should be established, it is borne in mind that this line of sight is established with a transit for purposes of making certain horizontal measurements, and with a tilting level instrument for obtaining certain vertical measurements where both horizontal alignment and vertical alignment along the train are to be investigated. Considering first the horizontal alignment procedure, it is necessary that a stable base platform be located for setting up the transit for establishing the reference line of sight. This base for the transit will, of necessity, be offset to one side of the train, and must be located so that a clear line of sight can be extended substantially parallel to the line along which the train extends, or more specifically, the line along which the axes of rotation of the shafts involved may extend. It is, moreover, desirable that the base for supporting the transit be located so that the line of sight from the telescope of the transit need not be extended more than about 30 feet in each direction from the transit in order to reach to the opposite ends of the kinematic train. In some instances, this desideratum will dictate that the transit be set up about midway of the kinematic train, and in other situations where the train is relatively short, the transit may be set up at either end of the train. The instrument of the transit is then leveled and cross-leveled by adjustments provided in the conventional transit apparatus.

In the next step of the procedure, the temperature of each machinery unit is measured by any suitable means and the ambient or surrounding atmospheric temperature is also measured. These measurements of temperature are taken at a time when the machinery and the train is cold and in the non-operating state. The measurements of temperature on the machinery units are taken as near to the several reference points as possible, and, with the ambient temperature, are noted for subsequent usage in a manner hereinafter described.

It may be pointed out that the exact location of the legs of the transit on the base or supporting structure is carefully noted at this time, since it will be desirable at a subsequent point in the procedure to return the transit as nearly as possible to the same location on the base structure. It should also be noted that the base structure which supports the transit should be as free from vibrational disturbance as possible.

With the transit thus positioned, and the temperature measurements taken, a clear line of sight is then established as nearly parallel to the axis of rotation of the shafts along the kinematic train as is possible by visual estimation. Then, either at this time or subsequently, two aligned bench marks are established on the line of sight by suitably scribing structure which is in the line of sight, or by placing suitably scribed target-type bench marks on the line of sight. The bench marks must also be located on a stable structure, and must be relatively free from vibrational disturbance.

Figure 11:
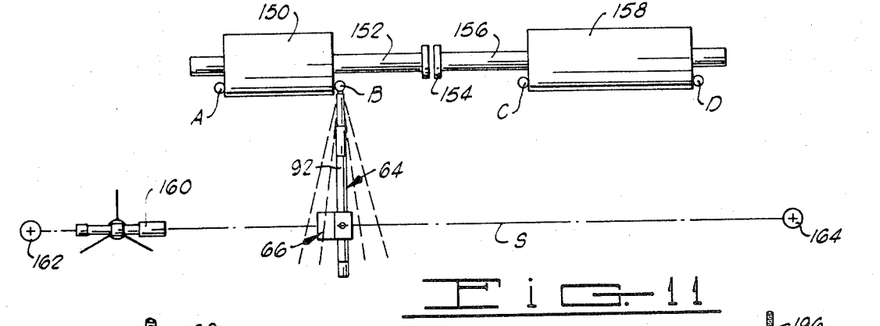
FIG. 11 is a schematic illustration of the manner in which the apparatus depicted in FIGS. 6–9 is utilized in the practice of the method of the invention.

In FIG. 11 of the drawings, the relationship of the kinematic train, transit instrument, bench marks and line of sight as hereinbefore described is illustrated. Thus, there are here shown a compressor 150 which has an output shaft 152 connected through suitable coupling 154 to the input shaft 156 of a turbine 158. The compressor 150 has secured in the housing thereof tooling balls A and B, and the turbine 158 has secured in the housing thereof tooling balls C and D. A reference line of sight S has been established alongside of the compressor 150 and turbine 158 by means of the transit 160, and this reference line of sight extends substantially parallel to the rotational axes of the shafts 152 and 156 or, stated differently, parallel to the direction of extension of the kinematic train constituted by the compressor 150 and turbine 158. A pair of bench marks 162 and 164 are set up in the plane of the line of sight S, either prior to commencing the measurements hereinafter described, or subsequently to this time.

When the telescope of the transit 160 has been locked in position so that it can be moved only in the plane of the established line of sight S one of the scale holder devices 10 or 64 hereinbefore described is used in conjunction with the optical scale carried thereby, and with the viewing box 66 and compound spirit level 68 to measure distances between the line of sight S and the several reference points represented by the tooling balls A, B, C and D. These distances are to be the shortest distances between the reference points and the line of sight S, and this requires that the measurements be made along lines which extend normal to the line of sight.

In obtaining the measurements, the metal contactors 14 or 76 located at one end of the scale holding device 10 or 64, respectively, is placed in contact with the tooling ball to which the measurement is to be made. It will be noted that the concave depression or recess 24 or 77 formed in the end of the metal contactor mates with the spherical peripheral surface of the tooling ball and permits the scale holder device in use to be swiveled about the tooling ball as may be required to bring the optical scale carried by the scale holder device into convergence with the line of sight S.

Referring, for purposes of illustration, only to the preferred scale holder device 64 shown in FIGS. 6-9, when the contactor 76 bears against the tooling ball to which a measurement is being made, the scale holder device is then pivoted until the optical scale 106 carried thereby crosses the line of sight S, and is visible through the telescope of the transit 160. If it is not already in a visible position, the viewing box 66 is then moved along the shaft 92 of the scale holder device 64 until the vertical crosshair of the transit crosses the central portion of the viewing box and extends in substantially the same direction as the parallel lines located on the inner faces of the plates 136 and 138.

When the scale holder device 64 and the viewing box 66 carried thereby are thus positioned, the scale holder device is then rocked or pivoted about its point of contact with the tooling ball to which the measurement is being made and in a substantially horizontal plane. Positions to which the scale holder device is rocked are illustrated in dashed lines in FIG. 11. This rocking of the scale holder device is continued only long enough to determine by sighting through the transit 160 a position at which the vertical crosshair of the transit extends parallel to, or coincident with, one or more of the parallel lines on the inside surfaces of the plates 136 and 138. When this status of the vertical crosshair in relation to the parallel lines is achieved, the linear axis of the optical scale 106 and of the scale holder device 64 is precisely normal to the established line of sight S. The function and usage of the viewing box 66 is explained in greater detail in co-pending application Ser. No. 828,911 to which reference has hereinbefore been made.

The compound spirit level 68 may be utilized at this time to assure that the vertical plane of the optical scale 106 extends precisely normal to the line of sight so that any parallax error and optical distortion in reading the scale can be reduced. With the scale holding device thus located, a reading of the optical scale is made at the point where the vertical crosshair of the transit crosses the scale. The optical scales used in the practice of the invention are conventionally graduated in tenths of inches and by the use of a micrometer adjustment on the transit, it is possible to obtain further precision and accuracy so that a reading of the distance from the optical line of sight to the surface of the tooling ball is made to within 0.001 inch.

The described procecure is repeated for the reference points represented by each of the tooling balls A, B, C and D mounted on the machinery units throughout the kinematic train. The measurements so obtained are recorded for later usage. As presently practiced, these measurements from the line of sight S to the reference points along the kinematic train, obtained while the machinery is in a cold, inoperative state, are considered to be measurements made to the machinery while it is in the state of alingment identified by the traditional dial indicator type measurements.

It may be pointed out before proceeding with the description of the invention that the arrangement depicted in FIG. 11 of the drawings is that which is employed when a relatively short kinematic train is the subject of the measurements. Thus, the transit 160 has been set up on a relatively stable base located just beyond one end of the train, and the bench marks 162 and 164 which have been set up in the vertical plane of the line of sight S, either before or after obtaining the described measurements, are located on the same side of the transit. Where a longer train of machinery is involved, however, the transit 160 will be set up opposite the center of the train so that wherever possible, the line of sight need not be extended more than about 30 feet in each direction from the transit in order to extend to the opposite ends of the train.

After the machinery in the kinematic train is operating and has become heated, another set of measurements are taken. It will frequently be the case that the transit 160 has previously been moved from the stable base upon which it was located for obtaining the cold measurements. In this event, the transit is set up for the purpose of taking the hot measurements at as nearly as possible the same location as it was set during the taking of the cold measurements. As will hereinafter appear, however, precise positioning of the transit and its telescope used for establishing the optical line of sight at the precise location at which they were located at the time that the cold measurements were taken is not essential to the performance of the method of the invention. This is because the hot measurements which are taken are corrected by the use of a convergence factor, and by thermal expension corrections, to the original line of sight values obtained when the apparatus was cold.

After the transit 160 has been set up at approximately the same location which it originally occupied, the telescope of the transit is used to sight in on the bench marks 162 and 164 which were originally established at the time of taking the cold readings. It will be apparent that if, as is usually the case, the transit is slightly off from the position it originally occupied, it will not be possible to extend the line of sight through the two bench marks 162 and 164. Rather, using the lateral adjuster mechanism of the transit and the azimuth tangent screw thereof (which are standard equipment on transits of the type employed), the optical line of sight is brought as nearly as possible into alignment with the two bench marks 162 and 164 by a straddling operation using these mechanisms.

With the establishment of a new line of sight S in the manner described, measurements of the temperature of the heated machinery, and of the environment of the machinery, are then made so that thermal correction factors can be introduced into the measurements to be obtained. These temperature measurements are compared to the cold temperature measurements of the machinery and of the environment of the machinery, and the temperature differences between the hot and cold operating conditions are obtained. Following the measurement of the heated temperature of the machinery, and the thermal environment (ambient temperature) at this time, a set of hot measurements is taken by extending the scale holder device 64 between the tooling balls A, B C and D and the reference line of sight S in the manner hereinbefore desribed. As previously mentioned, it is essential that the linear axis of the scale holder device and of the optical scale carried thereby extend normal to the optical line of sight S in order for the measurements to be accurate to the desired degree. Measurements are made from each of the tooling balls to the reference line of sight so that the set of readings obtained while the machinery is in the heated condition can be correlated and compared to the set of measurements obtained while the machinery is in the cold, inoperative condition.

Having completed the taking of the hot measurements, these readings are then corrected for thermal expansion of the machinery which may have caused the reference points to move outwardly with respect to the axis of rotation of the shafts 152 and 156, and which may have caused a significant expansion in the optical scale and in the scale holder device in which it is located. The coefficients of thermal expansion of these structures are, of course, known to a fairly precise degree. The corrected hot readings are then compared with the measurements obtained when the machinery was in a cold, inoperative state. The process of comparison entails initially selecting the two most widely spaced tooling balls which are located on a single unit of machinery in the kinematic train, and using these as a measuring base. Thus, in the system depicted in FIG. 11, the measurements made from the tooling balls C and D on the turbine 158 would be utilized for determining the departure and/or convergence of the "hot" line of sight to the "cold" line of sight, relative to the turbine 158. The departure and/or convergence factor is expressed in terms of thousandths of an inch per foot. For example, if the linear distance between tooling balls C and D along the turbine 158 were ten feet, and assuming that the distance from the tooling ball D to the reference line of sight obtained in the taking of a hot measurement were 0.002 inch greater than the corresponding measurement made to the original line of sight when the machinery was cold, and further assuming that the hot measurement made from the tooling ball C to the line of sight taken when the machinery is in the heated state is 0.002 inch less than the corresponding cold measurement, the convergence factor to be used in correcting hot measurements along the train for comparison with corresponding cold measurements would be 0.0004 inch/foot. This convergence factor is applied to the several hot measurements made along the train in proportion to their distances from tooling ball C to obtain the amount in thousandths of an inch by which each of the hot readings needs to be corrected (after introduction of the thermal correction hereinbefore described) to permit it to be compared with the corresponding cold measurement.

When the hot measurements, corrected in the manner described, are compared with the corresponding previously obtained cold measurements, it can be ascertained whether any unit in the kinematic train has shifted bodyily with respect to the others, and whether any angulation has developed between units as a result of movement of one of the units relative to the other. Thus, the extent of misalignment which may have developed can be identified with great accuracy. This evaluation of the extent of misalignment occurring during operation of the machinery will permit corrective action to be taken, such as better securement to the base or supporting structure, or more frequently, initially setting the machinery in a state of very slight misalignment so that, upon operation, the machinery will drift into alignment, or will at least only move very slightly out of alignment.

In addition to horizontal alignment of the machinery units of the kinematic train, carried out in the manner hereinbefore described, vertical alignment of the units of the train is also desirable since the same detrimental results which have been described can occur as a reslt of pronounced vertical misalignment. For the purpose of evaluating the vertical alignment of the machinery in the train, a tilting level is utilized similarly to the transit usage in obtaining horizontal measurements. In the vertical alignment measurement procedure, however, the process is somewhat simpler in that the tilting level need only be set up on a stable base which is relatively free of vibrational disturbance, and a horizontal plane then established by setting the telescope of the instrument in a fixed horizontal position. The telescope can then be swung about a vertical axis while remaining in this horizontal plane. In this way, the telescope can be swung to intercept with the line of sight, the scale holding device hereinbefore described which is now extended vertically from the reference points located on the machinery. Absolute verticality of the scale holder device can be obtained by the use of the compound spirit level 68 carried thereon.

As the measurements are taken in this manner from the refrence points to the reference line of sight which lies in the established horizontal plane, one of the reference points is denominated a base point and the distance from this reference point to the line of sight is noted for special future usage. The significance of thus obtaining a measurement to one reference point denominated as a base point is that when the set of hot measurements are later taken, it is not crucial that the tilting level be set at exactly the same absolute vertical location as that location which it previously occupied, and the horizontal plane in which the telescope is swung can be different from the original horizontal plane. It is only necessary to measure from the reference line of sight lying in this plane to the base point, and establish the distance as thus measured. This distance can then be, if desired, corrected to the original distance between the base point and reference line of sight, and comparisons made of the manner in which the distances from the reference line of sight to all other reference points have changed in relation to this "base" distance.

Figure 12:
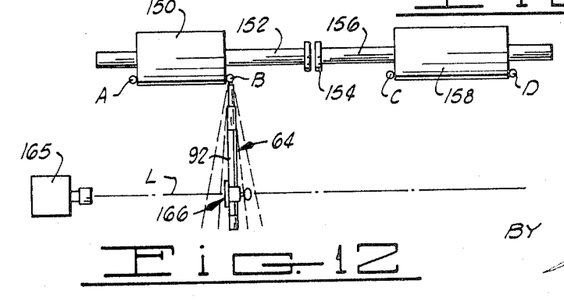
FIG. 12 is a schematic illustration of the manner in which certain laser apparatus is utilized in the practice of the method of the invention.

It should be pointed out before departing from a discussion of the method of the invention that substantially the same general method can be utilized employing a laser apparatus. This arrangement is schematically depicted in FIG. 12. In this figure, there is schematically illustrated a laser beam generator device 165 which directs a laser beam L along a line which extends substantially parallel to the axes of rotation of the shafts 152 and 156 of the compressor 150 and turbine 158, respectively. The scale holder device 64 is used as previously described. In this instance, however, a movable laser target 166 is movably positioned on the shaft 92 of the scale holder device 64 so that, by the use of a micrometer, the laser target can be shifted in very small increments of distance along the scale holder device. A precise reading of the exact location of the target 166 with respect to the optical scale 106 can be obtained from the micrometer device used to move the target along the shaft 92. The laser target 166 is sensitive to the intensity of the electromagnetic radiation in the laser beam L, and is constructed so that the highest intensity reading is obtained when the highly coherent light beam is exactly centered in a tiny bull's eye of the target. It is when the target has been moved to this position at which its readout system indicates that it is most nearly precisely aligned with the laser beam L that the scale reading is taken. Due to the high coherency of the light in the laser beam and the sensitivity of the laser target, it is possible with this type of apparatus and instrumentation to obtain very accurate readings of the distance between the reference line of sight and the reference points located on the machinery units in the kinematic train.

In FIGS. 13–24, there is illustrated apparatus used for supporting the scale holder device in a selected position to facilitate the realization of greater accuracy in performing the measuring functions hereinbefore described. With an accuracy of 0.001 inch within the capability of the measuring apparatus described, it is extremely difficult for a person to hold the scale holder device steady enough to avoid introducing errors which destroy this accuracy. Also, it is occasionally difficult or inconvenient for a person to find sufficient space adjacent the scale holder device to position himself there for the purpose of holding the scale holder device in a measuring position. The supporting apparatus alleviates these difficulties.

Figures 13, 15:
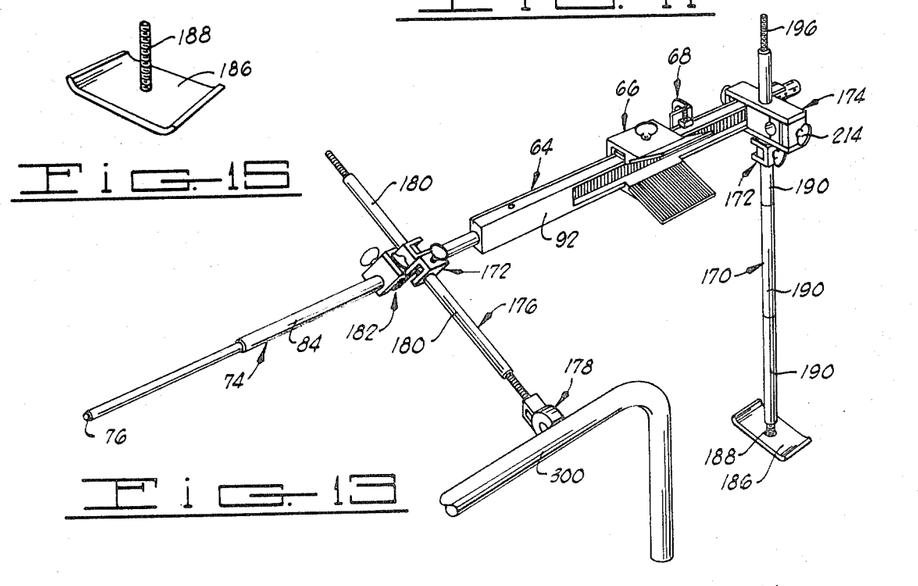
FIG. 13 is a perspective view illustrating the manner in which the scale holder device is utilized in conjunction with apparatus for supporting the scale holder device in certain preselected positions relative to machinery to be aligned in a kinematic train.
FIG. 15 is a perspective view of a base plate utilized with the vertical standard section shown in FIG. 14.
Figure 14:
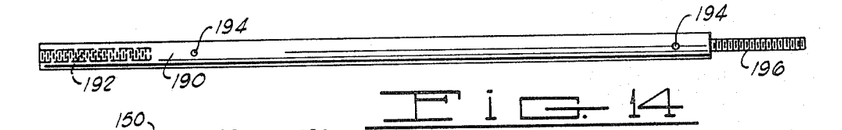
FIG. 14 is a side elevation view of a section of a vertical standard utilized in the scale holder supporting apparatus depicted in FIG. 13.

As shown in FIG. 13, the supporting apparatus includes an upright or vertical standard structure designated generally by reference numeral 170. A supporting clamp 172 is secured in a selected position on the vertical standard structure. A swivel clamp 174 is supported on the supporting clamp 172, and swivelly receives the upper portion of the vertical standard structure 170. In use, the swivel clamp 174 is clamped to a portion of the scale holder device 64 which is extended through this clamp at a right angle to the vertical standard structure 170.

A stabilizer structure may also be used as a portion of the supporting apparatus, and is designated by reference numeral 176 in FIG. 13. The stabilizer structure includes a magnetic retaining element 178, rod sections 180, and a stabilizer clamp 182. The stabilizer clamp 182 is clamped about one of the rod sections 180 at a selected location, and about a portion of the scale holder device 64. Since the vertical standard structure 170, supporting clamp 172 and swivel clamp 174 can be used independently of the stabilizer structure 176, the former structures and their functions will be initially described in detail before discussing further the stabilizer structure.

The vertical standard structure 170 includes a base plate 186 (see FIG. 15) which has secured to the central portion thereof, an upwardly projecting threaded bolt 188 which carries very fine threads. The vertical standard structure 170 further includes at least one rod section 190 of the type illustrated in FIG. 14. The rod section 190 has a bore 192 formed in one end thereof which is threaded to receive the threaded bolt 188. Spaced axially from the inner end of the bore 192 is a transverse aperture 194 formed diametrically through the rod section 190. The purpose of the aperture 194 is to permit a short handle bar to be extended through this aperture for the purpose of rotating the rod section 190 about its longitudinal axis, and thus to screw it up or down on the threaded bolt 188. At its end opposite the end in which the threaded bore 192 is formed, the rod section 190 carries a threaded projection 196 which is of the same diametric size as the bore 192 and as the bolt 188. The threaded projection 196 is provided with threads identical in size and pitch to the threads on the bolt 188, and formed in the bore 192. It should be pointed out that a plurality of the rod sections 190 are provided, and that due to the equal dimensioning of the threaded projections 196 and the threaded bores 192 therein, these rod sections can be screwed together to form an elongated member of the type depicted in FIG. 13.

Figure 16:
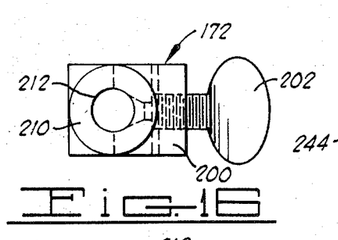
FIG. 16 is a plan view of a supporting clamp used on the vertical standard and forming a portion of the scale holder supporting apparatus.
Figure 17:
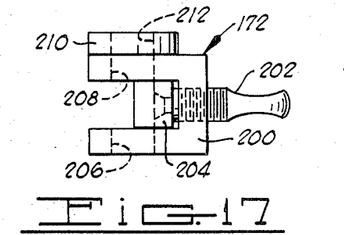
FIG. 17 is a side elevation view of the supporting clamp depicted in FIG. 16.

The supporting clamp 172 which is secured in a selected position to the vertical standard structure 170 is illustrated in detail in FIGS. 16 and 17. Referring to these figures, it will be noted that the supporting clamp 172 includes a C-shaped block 200 through the web portion of which is threaded the shank portion of a set screw 202. At its inner end, the shank portion of the set screw 202 is secured to a pressure plate 204 which has a semicylindrical recess formed in the side thereof opposite the side which is attached to the shank portion of the set screw. The pressure plate 204 is moved in the channel formed by the C-shaped block 200 when the set screw 202 is rotated. Formed through the legs of the C-shaped block 200 are a pair of circular apertures 206 and 208. The apertures 206 and 208 are aligned with each other, and are of a diametric dimension which corresponds to the diametric dimension of the semicylindrical recess formed in the pressure plate 204. A spacer ring 210 is mounted on the outer side of one of the legs of the C-shaped block 200 and is provided with a circular aperture 212 therethrough which is identically dimensioned, and is aligned with, the circular aperture 208 in the adjacent leg of the C-shaped block.

It will be apparent that in the use of the supporting clamp 172, the set screw 202 is rotated to retract the pressure plate 204 to a position such that one of the rod sections 190 can be passed through the aligned circular apertures 206, 208 and 212. The set screw 202 is then rotated, after the clamp 172 has been placed in the desired position on the vertical standard structure 170, the cause the pressure plate 204 to bear against the particular rod section 190 adjacent which the clamp is located, and thus secure the clamp to this rod section.

Figure 18:
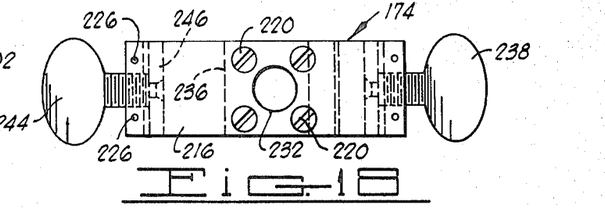
FIG. 18 is a plan view of a swivel clamp utilized for securing a scale holder device to the vertical standard and forming a portion of the scale holder device supporting apparatus of the invention.
Figure 19:
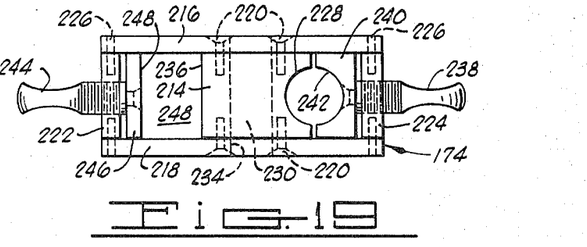
FIG. 19 is a side elevation view of the clamp depicted in FIG. 18.

The swivel clamp 174 is illustrated in detail in FIGS. 18 and 19. The swivel clamp 174 includes a central block 214 which is secured between a top plate 216 and a bottom plate 218 by means of suitable screws 220. The plates 216 and 218 also have secured between the ends thereof, a pair of end plates 222 and 224. The end plates are held in position by means of suitable pins 226.

In referring to the central block 214, it will be perceived that this structure is shaped as a right parallelepiped having a semicylindrical recess 228 formed in one side thereof. It will also be noted that the central block 214 has extended through the center thereof, a cylindrical bore 230 which is aligned, or in registry, with a circular aperture 232 formed through the top plate 216 and a corresponding circular aperture 234 formed through the bottom plate 218. At its side opposite the side in which the semicylindrical recess 228 is formed, the central block 214 has a planar face 236 which extends between the top plate 216 and the bottom plate 218. Screwed through the end plate 224 is the shank portion of a set screw 238. The inner end of the shank portion of the set screw 238 is secured to a pressure plate 240 which has a semicylindrical recess 242 formed therein. The semicylindrical recess 242 in the pressure plate 240 is complementary in configuration to the semicylindrical recess 228 formed in the central block 214 so that the mated semicylindrical recesses 242 and 228 form a cylindrical bore.

At the opposite side of the swivel clamp 174 from the set screw 238, a second set screw 224 has a shank portion threaded through the end plate 222 and carrying at its inner end a pressure plate 246. The pressure plate 246 has a substantially monoplanar pressure face 248 which is movable toward the face 236 of the central block 214 when the set screw 244 is screwed inwardly in the endplate 222. It will be apparent that the top plate 216, bottom plate 218, pressure plate 246 and central block 214 define a rectangularly cross-sectioned passageway 249 which extends through the swivel clamp 174. In the use of the swivel clamp 174, this clamp is placed on the vertical standard structure 170 by passing the upper portion of the rod section 190 upon which the supporting clamp 172 is secured through the circular apertures 232 and 234 in the plates 216 and 218, and through the cylindrical bore 230 formed through the central block 214. The swivel clamp 174 is thus permitted to encircle one of the rod sections 190 which carries the supporting clamp 172, and to rest upon the spacer ring 210 of the supporting clamp. It will be apparent that in this relationship, the swivel clamp 174 can be swiveled or pivoted about the aligned longitudinal axes of the interconnected rod sections 190.

The scale holder device 64 can be clamped in the swivel clamp in one of several ways. In the arrangement illustrated in FIG. 13, the elongated shaft 92 of the scale holder device 64 has been extended through the passageway 249 in one side of the swivel clamp 174, and is held in position by the pressure plate 246 which is brought to bear against the shaft 92 by screwing the set screw 244 inwardly. In alternative arrangements, the relatively large diameter intermediate portion 84 of the rod 74 forming a portion of the scale holder device 64 can be extended through the swivel clamp 174 between the pressure plate 240 and the central block 214 so that the large diameter cylindrical intermediate portion 84 of the scale holder device is received in the semicylindrical recesses 228 and 242. The scale holder device 64 can then be clamped securely in position by rotating the set screw 238 to cause the pressure plate 240 to bear firmly against the rod 74.

In yet another alternate arrangement which can be employed for supporting the scale holder device 64 in the swivel clamp 174, the cylindrical projection formed by the mated semicylindrical portions 118 and 114 of the device 64 can be extended between the pressure plate 240 and the central block 214, and this portion of the scale holder device then clamped securely in the swivel clamp 174 by rotation of the set screw 238.

In using the vertical standard structure 170, supporting clamp 172 and swivel clamp 174 in the practice of the method of the invention, the metallic contactor 76 forming the tip end of the scale holder device 64 is first placed on the tooling ball from which a measurement is to be made to the reference line of sight. The scale holder device 64 is then extended outwardly and is manually varied in its position until it extends through the vertical plane in which the line of sight lies. Then after merely approximating the position at which the line of sight will cross the scale holder device 64, the outer end of the scale holder device is clamped in the swivel clamp 174 in one of the ways described. The swivel clamp 174 has previously been placed in the described position atop the supporting clamp 172, with these clamps being located on the vertical standard structure 170 at a level which is approximately that of the plane containing the line of sight and the tooling ball reference point.

After the rod holder device 64 has been clamped in position in the swivel clamp 174, the lowermost rod section 190 can then be rotated about the threaded bolt 188 which projects upwardly from the base plate 186 to effect a precision adjustment of the vertical level at which the swivel clamp 174 is located, and thus effect an equally precise adjustment in the angle at which the scale holder device 64 extends with respect to the horizontal. It will be noted, of course, that rotation of the interconnected rod sections 190 about their longitudinal axes does not cause a concurrent rotation of the swivel clamp 174, since the upper rod section 190 is merely passed through the openings 232 and 234 in the plates 216 and 218, and through the cylindrical bore 230 in the central block 214. The diameters of these openings are sufficiently larger than the diameter of the rod section 190 that the clamp swivels freely on the rod section extended therethrough as this rod section is rotated. By means of the described vertical standard 170 and associated structure, the scale holder device 64 can be held steadily in a selected position without wavering, and without the necessity of a person taking a station in a cramped position in order to manually support the measuring apparatus.

Figure 24:
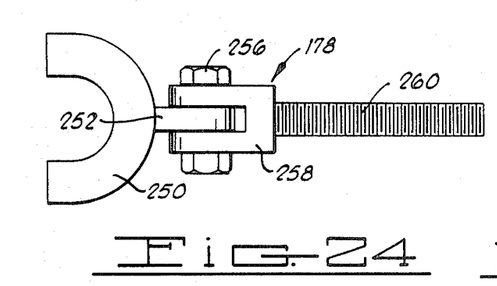
FIG. 24 is a view in side elevation of a magnetic retaining element used in conjunction with the stabilizer rod of the invention, and forming a portion of the scale holder supporting apparatus of the invention.

The stabilizer structure 176 is used to provide further support for the scale holder device 64 under certain conditions of usage. The stabilizer structure 176 includes one or more interconnected rod sections 180 which are identical in construction to the rod sections 190, and are joined together in substantially the same manner. The stabilizer structure 176 further includes a magnetic retaining element 178. The magnetic retaining element, as shown in FIG. 24, has a U-shaped magnet 250 at one end thereof, with the magnet having a bracket 252 secured to the web portion thereof. The bracket 252 is connected by a suitable bolt 256 to a U-shaped clevis 258 which is secured to one end of an elongated threaded bolt 260. The elongated threaded bolt 260 is substantially identical in dimensions, and in the character and pitch of the thread thereon, to the bolt 188 which is secured to, and projects upwardly from the base plate 186 of the vertical standard structure 170. The threaded bolt 260 is thus properly sized for threading into the threaded bore in any one of the rod sections 180 which, as will have become apparent from the foregoing discussion, and interchangeable with the rod sections 190. It will, of course, be apparent that when one or more rod sections 180 are connected to the magnetic retaining element 178 in the manner described, these rod sections may be swiveled about the axis of the bolt 256 to permit the rod sections to be extended in a selected direction from the U-shaped magnet 250.

The stabilizer clamp 182 which forms a portion of the stabilizer structure 176 is illustrated in detail in FIGS. 20-23. The stabilizer clamp 182 is a compound clamp which includes a lower block 262 and an upper block 264. The lower block 262 includes a pair of side plates 266 and 268 which are secured to an end portion 270, which in the illustrated embodiment of the invention is formed integrally with the side plates 266 and 268. The end portion 270 between the side plates 266 and 268 carries a threaded bore which receives the threaded shank portion of a set screw 272. At its inner end, the shank of the set screw 272 is secured to a pressure plate 274 which carries a concave, semicylindrical recess similar to the construction hereinbefore described. The recess in the pressure plate 274 is complementary in configuration to circular apertures 276 and 278 formed through the side plates 266 and 268.

The upper block 264 includes a C-shaped portion 280 which has a pair of aligned circular apertures 282 and 284 formed in the opposed, parallel legs thereof. A set screw 286 is threaded through the web of the C-shaped portion 280, and carries at the inner end of the threaded shank portion of the set screw, a pressure plate 288. The pressure plate 288 carries a semicylindrical recess which is dimensioned to register with the circular apertures 282 and 284 in the leg portions of the C-shaped portion 280.

Figures 20, 21, 22:
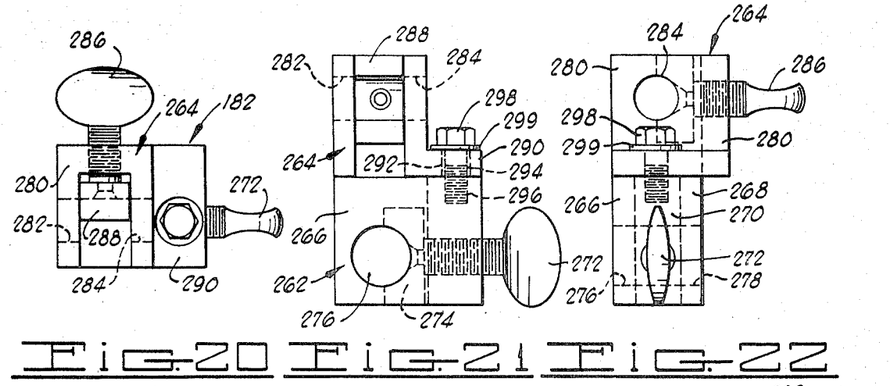
FIG. 20 is a plan view of a stabilizer rod clamp utilized for clamping a stabilizer rod to the scale holder device of the invention.
FIG. 21 is a side elevation view of the stabilizer rod clamp depicted in FIG. 20.
FIG. 22 is a second side elevation view of the stabilizer rod clamp, illustrating this clamp as it appears when rotated 90° from the position of this clamp depicted in FIG. 21.
Figure 23:
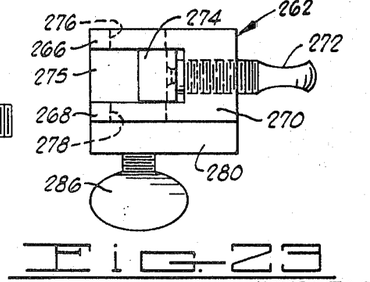
FIG. 23 is a bottom view of the clamp depicted in FIGS. 20–22.

A securement flange 290 is secured to the lower end portion of one of the legs of the C-shaped portion 280 of the upper block 264 and projects horizontally and outwardly therefrom as best shown in FIGS. 21 and 23. The flange 290 has a bore 292 formed therethrough, and a bearing sleeve 294 is positioned in this bore. The bore 292 is aligned with a threaded bore 296 formed in the end portion 270 of the lower block 262 so that the upper block 264 may be swivelly secured to the lower block by means of a threaded bolt 298 which is passed through the bearing sleeve 294 and threaded into the bore 296. The head of the threaded bolt 298 contacts a washer 299 which bears against the upper end of the bearing sleeve 294 so that the upper block 264 may pivot freely on the lower block 262.

In the use of the stabilizer structure 176, the rod sections 180 are made up in serial alignment as illustrated in FIG. 13 to form a composite rod of sufficient length to reach from a stabilizing structure, such as the metallic conduit 300 illustrated in FIG. 13, outwardly to the location of the scale holder device 64 when it is in the position described. The magnetic retaining element 178 is then magnetically attached to the conduit 300, or other stabilizing structure, and the composite rod made up of the interconnected rod sections 180 is extended outwardly therefrom. The stabilizer clamp 182 has previously been placed on one of the rod sections 180 by sliding the rod section through the aligned circular apertures 282 and 284 in the C-shaped portion 270 of the upper block 264 of the stabilizer clamp. The stabilizer clamp 182 is not secured tightly to the rod section 180 at this time, but rather, the clamp is permitted to slide freely on the rod section until connection with the scale holder device 64 has been effected. This connection is achieved by passing the relatively large diameter, cylindrical intermediate portion 84 of the rod 74 through the passageway formed through the lower block 262 of the stabilizer clamp 182. If desired, a supporting clamp 172 may be secured to rod section 180 adjacent the stabilizer clamp 182 and the rod sections 180 screwed inwardly or outwardly to obtain a fine adjustment of the position of the scale holder device 64. When this has been accomplished, the set screws 272 and 286 can be rotated to set the pressure plates 274 and 288 respectively against the rod 74 and against the rod section 180. With the stabilizer structure 176 in use in this manner, a two-point support for the scale holder device 62 is afforded by this structure in conjunction with the vertical standard structure 170 and the associated clamps. Thus, an even more stable positioning of the measuring apparatus is achieved without the necessity for manual manipulation or support.

Although certain preferred embodiments of the present invention have been herein described in order to provide an example of its construction and steps sufficient for usage by those skilled in the art, it is to be understood that various changes and innovations in the structure described, and in the method discussed, can be effected without departure from the basic principles of the invention. Changes and revisions of this sort which continue to rely on these principles are therefore deemed to be circumscribed by the spirit and scope of the invention.

What is claimed is:

1. Apparatus for measuring distance comprising:
   a. shaft means having a first and second end, said shaft means consisting of material having a low thermal coefficient of expansion;
   b. a contactor means mounted in said first end of said shaft means;
   c. an optical scale;
   d. scale receiving means attached to the second end of said shaft means in a manner so that axis of the scale receiving means will lie in a plane parallel to the axis of said shaft means, said scale receiving means including a slot means extending longitudinally along a portion of the scale receiving means and having a length equal to or longer than said scale, and slidably and freely receiving said optical scale in said slot means; and e. means for dimentionally positioning said optical scale with said contactor means mounted in the first end of said shaft means whereby expansion of said scale receiving means will not affect the position or cause expansion of said optical scale means in its dimensional relationship to the contactor means mounted in the first end of said shaft means.

2. Apparatus for measuring as defined in claim 1 wherein said shaft at said first end includes an axial bore, means for mounting said contactor means comprising:

a shaft portion extending into the bore in said rod; and a head on the end of said shaft portion outside said bore and having a concave depression therein for mating contact with a tooling ball.

3. Apparatus for measuring as defined in claim 1 wherein said scale receiving means is further characterized in having a bore in one end thereof for receiving a cylindrical portion of said shaft means.

4. Apparatus for measuring distance as defined in claim 1 wherein said shaft means is a phenol-formaldehyde resin having asbestos fibers embedded therein.

5. Apparatus for measuring distance as defined in claim 1 wherein said positioning means comprises a metal stop plate rigidly and permanently secured in said slot at the second end of said shaft means and in alignment with said slot means thereof for abutting one end of said optical scale slidingly inserted in said slot.

6. Measuring apparatus as defined in claim 1 and further characterized to include:

a stabilizer structure connected to said shaft means and comprising:

elongated rod means;

a stabilizer clamp secured to said rod means intermediate its length, and pivotally connected to said shaft means; and a retaining element secured to one end of said rod means for retaining said stabilizer structure against the side of a physical structure.

7. Measuring apparatus as defined in claim 6 wherein said stabilizer clamp comprises:

an upper block receiving said shaft means therethrough and including a pressure plate engageable with said shaft means; and a lower block pivotally connected to said upper block and receiving said rod means therethrough, said lower block having a pressure plate movably mounted therein and engageable with said rod means.

8. Measuring apparatus as defined in claim 6 wherein said elongated rod means comprises a plurality of rod sections connected to end-to-end relation and having one of said rod sections connected at one end to said retaining element, said rod sections each having a threaded bore in one end, and a threaded projection at its end opposite the end in which the threaded bore is located, and threadedly engaging the threaded bore in the end of an adjacent rod section.

9. Apparatus for measuring as defined in claim 1 and further characterized to include:

a vertical standard structure; and means connecting said shaft means to said vertical standard structure for pivotation of said shaft means about a substantially vertical axis.

10. Apparatus for measuring as defined in claim 9 wherein said vertical standard structure comprises:

a base plate;

a threaded bolt extending upwardly from said base plate; and a plurality of rod sections connected in end-to-end relation and having one of said rod sections connected at one end to said threaded bolt, said rod sections each having a threaded bore in one end, and a threaded projection at its end opposite the end in which said bore is located.

11. Apparatus for measuring as defined in claim 9 wherein said connecting means comprises:

a supporting clamp secured to said vertical standard structure in a fixed location therealong; and a swivel clamp resting upon said supporting clamp, clamped upon said shaft means and rotatable upon said vertical standard structure about a vertical axis.

12. Apparatus for measuring as defined in claim 10 wherein said swivel clamp comprises:

a central block having a semicylindrical recess in one side thereof and a planar face on the opposite side thereof, said block having a bore extending through the central portion thereof between said one side and said opposite side; a pair of end plates spaced from the opposite sides of said central block which have said planar face and said semicylindrical recess therein;

a pair of substantially parallel side plates having said end plates and central block secured therebetween, and having circular apertures therein aligned with the bore through said central block;

a first pressure plate positioned between one of said end plates and the recessed side of said central block;

a second pressure plate positioned between the other of said end plates and the planar side of said central block; and screw clamps connected to said pressure plates and threadedly extended through said end plates whereby when said screw clamps are rotated, said pressure plates are advanced toward said central block.

* * * * *